United States Patent [19]

Smith

[11] 4,098,099
[45] Jul. 4, 1978

[54] REEL LOCK

[76] Inventor: Marvin D. Smith, 820 N. 89th St., East St. Louis, Ill. 62203

[21] Appl. No.: 773,696

[22] Filed: Mar. 2, 1977

[51] Int. Cl.² ............................................. E05B 71/00
[52] U.S. Cl. ...................................................... 70/18
[58] Field of Search ............................. 70/18, 58, 233

[56] References Cited

U.S. PATENT DOCUMENTS

| 3,611,760 | 10/1971 | Muther | 70/18 |
| 3,990,279 | 11/1976 | Brickel | 70/233 |

*Primary Examiner*—Richard E. Moore
*Attorney, Agent, or Firm*—Lionel L. Lucchesi

[57] ABSTRACT

A lock is provided which is particularly well adapted for use with a two wheel vehicle. Preferably, the lock includes an enclosure having a shaft mounted to it. A spool or reel includes spaced end plates and a central storage hub between the plates. The reel is rotatably mounted to the shaft. The spool or reel holds reaches of steel cable of other like securing means. A free end of the cable has an eyelet formed on or attached to it. A housing is mounted to the enclosure which contains a suitable locking device including a plunger. The housing has an opening in it sized to receive the free end of the cable. The plunger is movably mounted between a first position, where the plunger is spaced from the reel, and a second position, where the plunger engages the reel. The lock is used by encircling the object, passing the eyelet through the opening in the housing, and passing the plunger through the eyelet and reel. The eyelet is sized so that it may receive the plunger as the plunger passes from its first to its second position. In the second position, the plunger holds the eyelet of the cable fixed within the housing, and prevents rotation of the spool. Preferably, the reel is spring bias in one direction of rotation.

10 Claims, 4 Drawing Figures

REEL LOCK

BACKGROUND OF THE INVENTION

This invention relates to locking means, and in particular, to a lock finding application in conjunction with two wheeled vehicles. While the invention is described with reference to its use with such vehicles, those skilled in the art will recognize the wider applicability of the inventive principles disclosed hereinafter.

The increased popularity of two wheeled vehicles, normally configured as conventional bicycles or vehicles powered by internal combustion engines, for example, has become a relatively recent economic fact of life. Their popularity is such that many businesses provide special parking facilities for those vehicles. Although the initial investment required for ownership of these vehicles is less than an automobile, the cost generally is sufficient to warrant concern over possible loss of the vehicle. Unfortunately, the popularity of these vehicles had lead to an increased incidence of theft. A number of locks are known in the art which have as an object theft prevention during periods of vehicle non-use. While these devices work for their intended purposes, they have not been overly successful in preventing theft because they usually can be circumvented rather easily, or their size and bulk either have been insufficient for their purpose or has made the device too large for easy handling.

The invention disclosed hereinafter overcomes these prior art deficiencies by providing a lock particularly well suited for use with two wheeled vehicles. Preferably, the lock includes a reel having reaches of steel cable wound about it. The cable is extracted to enable the user to wrap the cable about both the vehicle to be secured and about any other convenient immovable structure. Thereafter, an end of the cable is inserted into a housing, thereby closing the loop of the lock. Plunger means is inserted through a loop along the end of the cable within the housing, preventing the unauthorized removal thereof.

One of the objects of this invention is to provide a low cost, yet effective lock structure.

Another object of this invention is to provide a lock structure utilizing a reel for increasing the capacity of material available for use in securing one object to another.

Still another object of this invention is to provide a lock structure and enclosure which is handy and convenient in size.

Another object of this invention is to provide a lock structure in which the terminal end of an encircling means is completely enclosed by the lock structure in applicational use of the device.

Other objects of this invention will be apparent to those skilled in the art in light of the following description and accompanying drawings.

SUMMARY OF THE INVENTION

In accordance with this invention, generally stated, a locking means is provided which utilizes a reel for storing reaches of suitable cable. The locking means includes an enclosure for the reel and a housing for attaching a plunger type lock to the enclosure. The enclosure and reel each have suitable openings in them for receiving the plunger. The cable has an eyelet on its free end which is inserted in the housing and receives the plunger in the locked position of the device. In the preferred embodiment, the reel is spring biased in one direction of reel rotation to provide an automatic rewind feature for the lock.

DESCRIPTION OF THE PREFERRED EMBODIMENT

Figure 1:
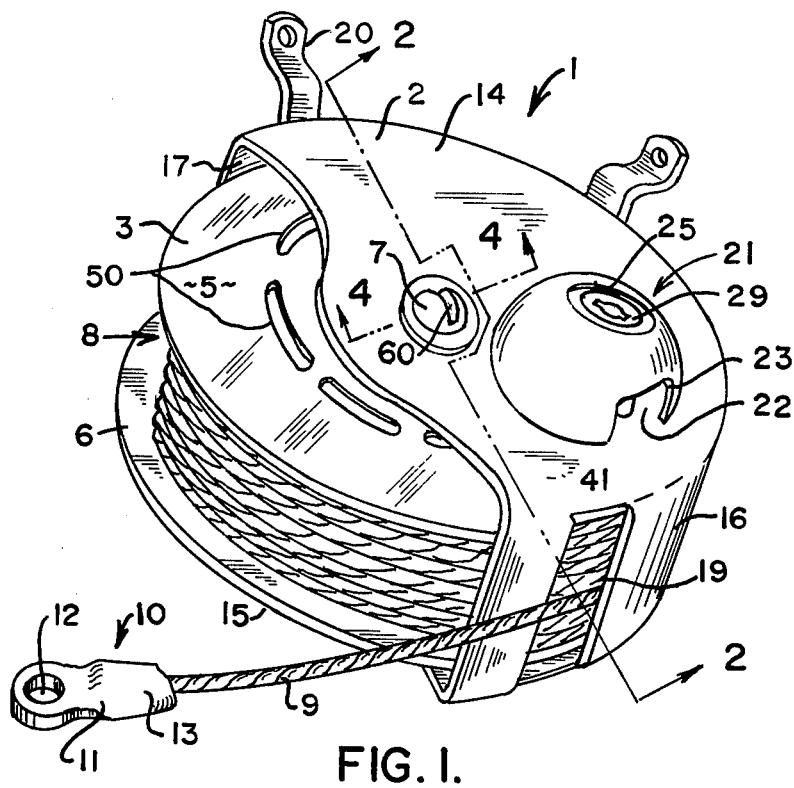
FIG. 1 is a view in perspective, of one illustrative embodiment of lock of this invention.

Referring now to FIG. 1, reference numeral 1 indicates one illustrative embodiment of locking means of this invention. The locking means 1 includes an enclosure 2 which at least partially surrounds a reel 3 and provides an attachment surface for a lock housing 21.

The reel 3 is constructed in a familiar spool arrangement, including a pair of spaced, circular plates 5 and 6 which are joined to one another along a central hub 40. The hub 40 has an axial opening through it, which is sized to receive a shaft 7. In the embodiment illustrated, the shaft 7 is a threaded fastener passing through the enclosure 2 and the reel 3 in a conventional manner. Preferably, the shaft 7 is designed with a one way bolt head 60. That is to say, the fastener comprising the shaft 7 can be tightened with a conventional screwdriver, but can not be removed with one. In other embodiments of the invention, the shaft 7 also may serve as the hub for the reel 3, the plates 5 and 6 being attached directly thereto. Other shaft forms also are compatible with the broader aspects of this invention, and one such design is later described in conjunction with FIG. 4. In any case, the reel 3 is made rotatable with respect to the enclosure 2 by mounting the reel along suitable bearing surfaces in the case where the independent hub is used, or by making the shaft 7 rotatable with respect to the enclosure 2, once again along suitable bearing surfaces, not shown, where the shaft is integrally constructed with the reel 3. The area between the plates 5 and 6 delimit a storage area 8 in which reaches of cable 9 may be stored.

The cable 9 has a first end attached to the reel 3 and a free, second end 10. In the embodiment of FIG. 1, the end 10 of the cable 9 is terminated in an eyelet 11. The eyelet 11 has an opening 12 through it. The eyelet 11 is conventional, and generally has a body 13 having a receptacle formed in it, enabling the eyelet 11 to receive the cable 9, after which the body 13 is crimped or otherwise fastened to the cable 9. In any event, the eyelet 11 is securely attached to the cable 9 so that it can not be parted even when considerable force is applied to it and the cable 9. In the alternative, the cable 9 may be looped along its free end 10 so as to define the opening 12. Use of the eyelet 11, however, facilitates production of the locking means 1. The cable 9 preferably is a steel cable which may be coated with a suitable insulative material. Such insulative material is useful in preventing damage to objects secured by the cable, as later described in greater detail.

Figure 2:
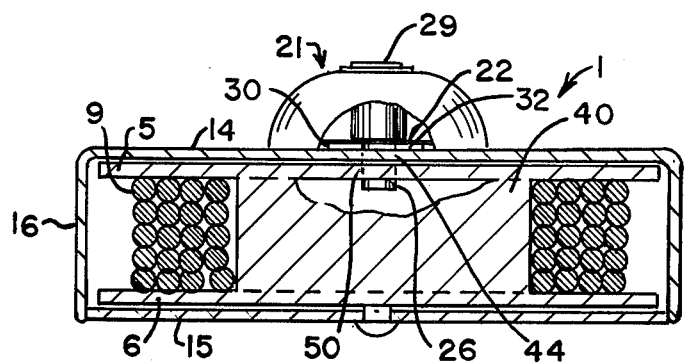
FIG. 2 is a sectional view, partly broken away, taken along the line 2—2 of FIG. 1.
Figure 3:
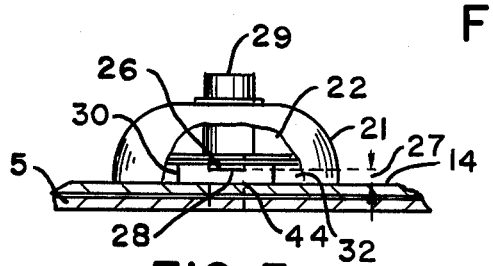
FIG. 3 is a view of the lock housing, partly broken away, the lock being shown in its open position.

The plate 5 has a plurality of arcuate openings 50 formed in it, the functions of which are later described. In FIGS. 2 and 3, the reel 3 is shown generally as freely rotatable on the shaft 7, as opposed to being spring biased against rotation in one direction, for example.

Figure 4:
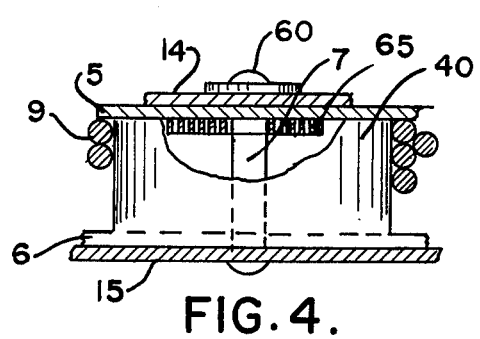
FIG. 4 is a sectional view, partly broken away, taken along the line 4—4 of FIG. 1.

FIG. 4 illustrates the use of a spring 65 for biasing the shaft 7 toward one direction of rotation. Spring 65 is a conventional spring coil which stores energy as the cable 9 is extracted, enabling the spring to rewind the cable upon release thereof. Consequently, the construction of FIG. 4 provides an automatic rewind feature for the locking means 1. Either construction described is compatible with the broader aspects of my invention.

Enclosure 2 includes a top wall 14, a bottom 15 and a side wall 16. As illustrated in the drawings, the walls 14, 15 and 16 generally are arranged in a cylindrical shape, and delimit a chamber 17 in which the reel 3 is housed. In general, the reel 3 is totally contained within the enclosure 2, the cut away of the walls 14, 15 and 16 shown in the drawings being for illustrative purposes only. For that reason, FIG. 2 is shown in total cross section as opposed to the cut away version of FIG. 1. As shown in FIG. 2, the top 14 and side 16 are integrally formed with one another, the bottom 15 being joined to the top and side by any convenient method. Other structure combinations of top, bottom and side walls may be used, if desired. The side 16 has an opening 19 formed in it, which communicates with the chamber 17. The opening 19 provides ingress and egress to the chamber 17 for the cable 9. Preferably, the eyelet 11 is dimensionally larger than a width dimension 41 of the opening 19, so that the eyelet acts as a stop in one direction of reel 3 rotation.

The enclosure 2 also has a plurality of legs 20 associated with it. In the embodiment illustrated, the legs 20 are attached to the side wall 16 by any convenient method. Since the enclosure 2 preferably is constructed from metal, the legs 20 may be spot welded to the side wall, for example. The legs 20 in fact are leg pairs, only one of which is observable in the drawings. The legs 20 may be used to attach the locking means 1 to the vehicle with which the device 1 finds application. Thus, the locking means 1 may be attached to the frame of the vehicle with which it finds application through the use of a conventional one way screw, which prevents unauthorized removal of the device. After attachment, locking means 1 is available for use whenever needed.

The housing 21 is attached to the top plate 14 of the enclosure 2. Housing 21 delimits a cavity 22 which is open along a mouth 23. A plunger lock 25 is attached to the plate 14 within the housing 21. Preferably, the lock 25 is a conventional type lock having push button 29 operatively connected to a spring actuated plunger 26. Push button 29 extends through a suitable opening in the housing 21. The plunger 26 is movable between a first position, shown in FIG. 2, and a second position, shown in FIG. 3. The position of FIG. 3 is the unlocked condition of the lock 25, while the locked condition is shown in FIG. 2. As observable in FIG. 3, the plunger 26 is spaced from the top wall 14 of the enclosure 2 in the unlocked position of the locking means 1 along a clearance 27, measured between an end 28 of the plunger 26 and the top wall. The housing 21 and lock 25 are placed over an opening 44 in the top wall 14. The opening 44 is located radially outwardly of the shaft 7 a distance equal to the radial distance from the shaft 7 of the openings 50 in the top plate 5. Plunger 26, in turn, is aligned with the opening 44 so that a force applied on the push button 29 of the plunger lock 25 forces the end 28 of the plunger 26 through the openings 44 and 50. Since the plunger 26 enters the reel 3, it acts as a positive stop for the reel, preventing further reel 3 movement, at least beyond the arcuate confines of the openings 50. Some movement of the reel 3 is permitted, even after insertion of the plunger 26 within the openings 50. That movement, however, is limited to the arc of the openings 50. The plunger lock 25 itself is conventional and is not described in detail. A number of plunger locks are available commercially, any one of which is acceptable for use in the locking means 1.

The eyelet 11 is sized to permit its passage through the mouth 23 in the housing 21 and to pass along the clearance 27 in the unlocked position of the plunger lock 25. A spacer 30 is mounted with the cavity 2 between the top wall 14 and a casing 31 of the plunger lock 25. The spacer 30 defines a channel 32 which guides the opening 12 of the eyelet 11 into position beneath the plunger 26 upon eyelet 11 insertion within the housing 21.

Operation of the locking means 1 of this invention is relatively simple to understand. When a vehicle, as for example, a bicycle or motorcycle of the conventional type, is parked, the device 1 is used to lock that vehicle to any convenient structure, thereby preventing unauthorized removal or use of the vehicle. The cable 9 is extracted from the chamber 17 in any length sufficient to wrap the cable 9 about a structural member of the vehicle and any convenient, non-movable object. Thereafter, the eyelet 11 is inserted in the cavity 22 through the mouth 23, the spacer 30 acting to guide the opening 12 into alignment with the end 28 of the plunger 26. The push button thereafter is forced downwardly, downwardly being referenced to the drawing. Such movement acts on the plunger 26 so that the end 28 passes through the eyelet 11, the top wall 14 and the plate 5, until the plunger position shown in FIG. 2 is reached. In that position, the plunger 26 has the eyelet 11 attached to it, and prevents further rotation of the reel 3.

Unlocking the plunger lock 25 raises the plunger 26 to the position shown in FIG. 3, and permits extraction of the eyelet 11 from the cavity 22. With the embodiment of FIG. 4, extraction of the eyelet 11 permits automatic rewind of the cable 9. Hand rewind of the cable may be utilized, however, if desired. It should be noted that approximately the entire axial length of the eyelet body 13 is insertable within the cavity 22. Preferably the mass of the eyelet 11 nearly closes the mouth 23, making the interconnection of the eyelet 11 and the plunger 26 more tamper proof than locks previously known in the art. The cable 9, as indicated, preferably is a steel cable of sufficient size to prevent cut through without some special cutting tool or device.

Numerous variations, within the scope of the appended claims, will be apparent to those skilled in the art in light of the foregoing description and accompanying drawings. For example, the design silhouette of the device 1 may vary in other embodiments of this invention. In like manner, various materials described as preferred may be varied in other invention embodiments. The length of the cable 9 and the design of the eyelet 11 may be changed. The relative location of one or more structural features of the device 1 may be altered. As indicated, either automatic or hand rewinding may be employed. Automatic rewind also may use selective stopping arrangements in addition to the plunger-reel interconnection described above. These variations are merely illustrative.

Having thus described the invention, what is claimed and desired to be secured by Letters Patent is:

1. A locking means, comprising:

an enclosure, said enclosure including a top wall having at least one opening in it;

reel means rotatably mounted to said enclosure, said reel means including a spool having spaced first and second sides defining a storage area therebetween, said first side having at least one opening in it, said last mentioned opening being alignable with the opening in the top wall of said enclosure as said reel means rotates with respect to said enclosure;

cable means windable and winded on said reel means, said cable means having a free first end, said free first end having an eyelet formed in it, said eyelet defining an opening; and a locking device mounted to said enclosure, said locking device including a plunger movable between at least a first position and a second position, said plunger being insertable through the openings in said eyelet, said enclosure and said reel to define a locked arrangement for said locking means.

2. The locking device of claim 1 wherein said locking device is mounted in a housing attached to said top wall of the enclosure, said housing having an opening in it for receiving the eyelet of said cable, said eyelet being surrounded by said housing in the locked arrangement of said locking means.

3. The device of claim 2 wherein said enclosure generally surrounds said reel, said enclosure having a second opening in it for passing said cable from said reel means.

4. The locking means of claim 3 wherein said plunger is spring loaded in at least one position of said plunger.

5. The locking means of claim 4 wherein said reel means has a plurality of arcuate openings formed in said top wall for permitting passage of said plunger in the locked arrangement of said locking means.

6. The locking means of claim 5 further characterized by a shaft, said shaft being mounted to said enclosure, said shaft further having said reel means rotatably mounted thereon.

7. The locking means of claim 1 including means for biasing said reel toward at least one direction of rotation.

8. A locking means, comprising:

an enclosure, said enclosure having an opening in it;

reel means rotatably mounted to said enclosure, said reel means having a storage area for storing reaches of cable, said reel having an opening in it which aligns with the opening in said enclosure to define a passage along said enclosure and said reel;

a length of cable stored on said reel, said cable having a first end attached to said reel and a free second end extending outwardly of said enclosure, the free end of said cable having a closed opening formed along it, said cable end being positioned to align with the passage along said enclosure and said reel means; and a lock mounted to said enclosure, said lock including a plunger member aligned with said passage and movable between a first position remote from said passage and a second position within said passage.

9. The locking means of claim 8 including means for biasing said reel means toward at least one direction of rotation.

10. The locking means of claim 9 wherein said lock is mounted in a housing attached to said top wall of the enclosure, said housing having an opening in it for receiving the eyelet of said cable, said eyelet being surrounded by said housing in the locked arrangement of said locking means.

* * * * *

UNITED STATES PATENT AND TRADEMARK OFFICE
CERTIFICATE OF CORRECTION

PATENT NO. : 4,098,099
DATED : July 4, 1978
INVENTOR(S) : Marvin D. Smith

It is certified that error appears in the above-identified patent and that said Letters Patent are hereby corrected as shown below:

Column 4, line 11, delete "2" and insert --- 22 ---

Signed and Sealed this

First Day of May 1979

[SEAL]

Attest:

RUTH C. MASON
Attesting Officer

DONALD W. BANNER
Commissioner of Patents and Trademarks